Jan. 8, 1952 — J. A. O'REILLY — 2,581,696
COMBINATION SHIRT BOARD AND COLLAR PROTECTOR
Filed Dec. 6, 1949 — 4 Sheets-Sheet 1
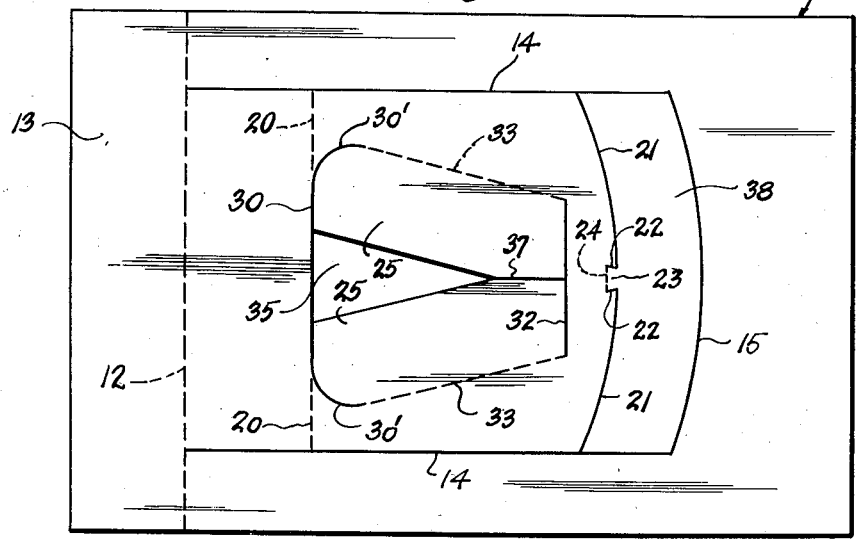
INVENTOR.
JOSEPH A. O'REILLY
BY Cook & Robinson
ATTORNEYS Jan. 8, 1952   J. A. O'REILLY   2,581,696
COMBINATION SHIRT BOARD AND COLLAR PROTECTOR
Filed Dec. 6, 1949   4 Sheets-Sheet 2

INVENTOR.
JOSEPH A. O'REILLY
BY
Cook & Robinson
ATTORNEYS

Jan. 8, 1952 J. A. O'REILLY 2,581,696
COMBINATION SHIRT BOARD AND COLLAR PROTECTOR
Filed Dec. 6, 1949 4 Sheets-Sheet 3
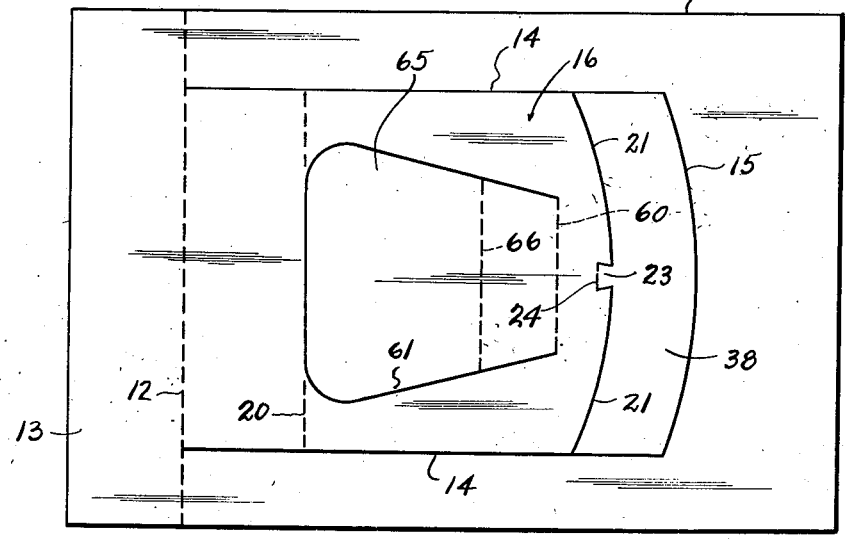
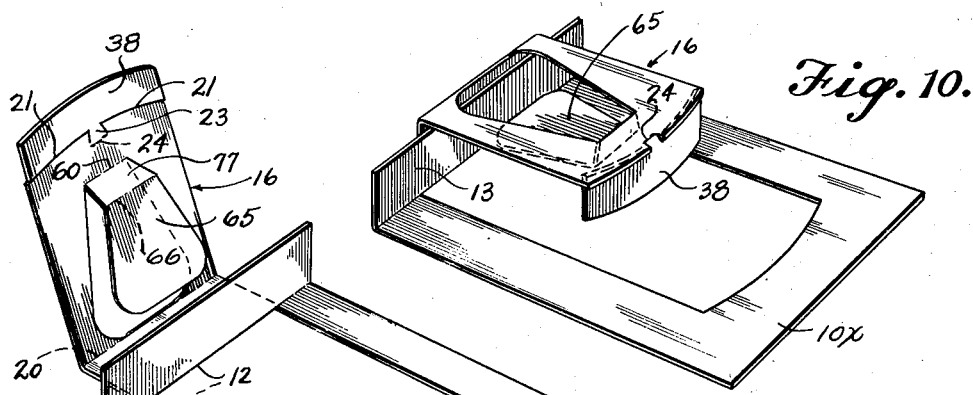
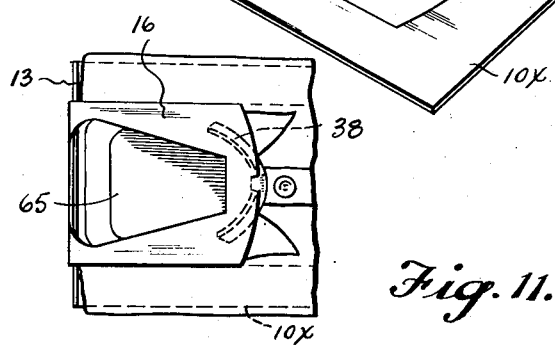
INVENTOR.
JOSEPH A. O'REILLY
BY
Cook & Robinson
ATTORNEYS Jan. 8, 1952        J. A. O'REILLY        2,581,696
COMBINATION SHIRT BOARD AND COLLAR PROTECTOR
Filed Dec. 6, 1949        4 Sheets-Sheet 4
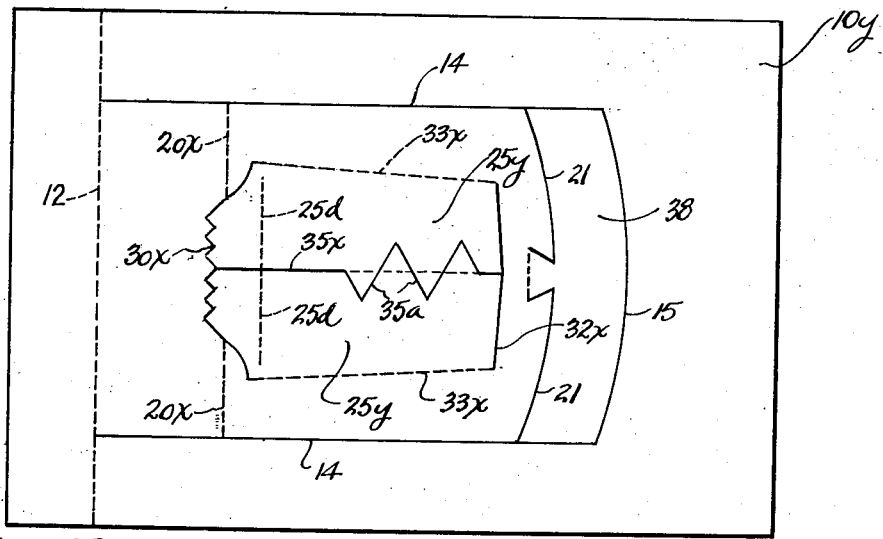
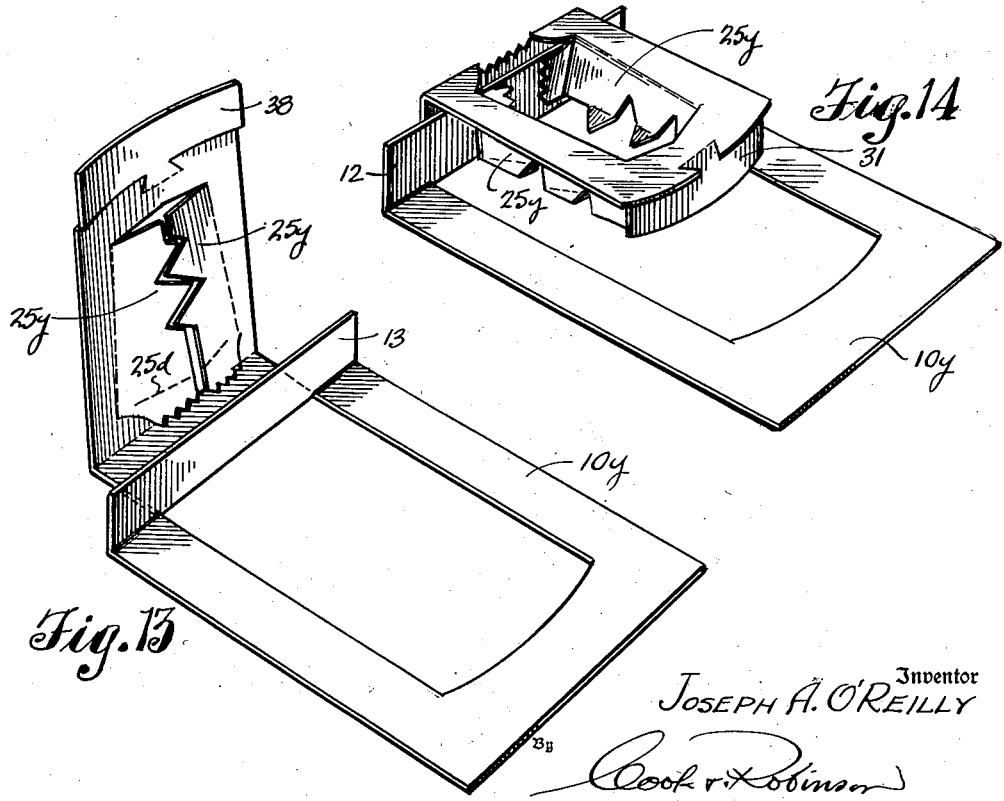
Inventor
JOSEPH A. O'REILLY
Attorney Patented Jan. 8, 1952

2,581,696

UNITED STATES PATENT OFFICE 2,581,696

COMBINATION SHIRT BOARD AND COLLAR PROTECTOR

Joseph A. O'Reilly, Bellingham, Wash.

Application December 6, 1949, Serial No. 131,344

11 Claims. (Cl. 223—71)

This invention relates to articles known in the laundry business and related industries as "shirt boards and collar supports"; such articles being used to protect freshly laundered and packaged shirts from being crushed or wrinkled while in packages or bundles during the delivery period.

It is the principal object of this invention to provide a combined or integral shirt-board and collar protector from a single blank of cardboard; the collar protecting element being formed from the central body portion of the blank and so scored and cut that, after the board and shirt have been properly functionally assembled, the collar protecting element may be easily and readily applied over the collar portion of the shirt and parts thereof folded into and about the collar in such manner that the latter will not, under ordinary or even unusually rough handling, be crushed, wrinkled or soiled.

It is also an object of the invention to so locate the collar forming portion in the blank that its displacement or folding therefrom and the folding or bending of its parts to their respective functional positions, will in no way lessen or detract from the efficient use of the board as applied within the shirt.

Still further objects of the invention reside in the novel way in which the blank is cut for the removal of the collar protecting panel therefrom, and in the manner of scoring and folding the parts of the panel to accomplish the desired results.

In accomplishing these and other objects of the invention, I have provided the improved details of construction, the preferred forms of which are illustrated in the accompanying drawings, wherein—

Fig. 1 is a plan view of a cardboard blank that is cut and scored in accordance with my invention to prepare it for its present use.

Fig. 2 is a perspective view showing the back folding of the collar protecting panel, preparatory to applying the board to a shirt.

Fig. 3 is a perspective view showing the relative positions of the shirt board and the collar protecting and supporting portions, thereof when applied to a shirt.

Fig. 8 is a plan view of a cardboard blank as cut and scored to form a board with a collar protecting portion of an alternative form.

Fig. 9 is a perspective view showing the initial folding of the collar protecting panel preparatory to assembling the board with a shirt.

Fig. 10 is a perspective view showing the relationship of the board and parts of the collar protecting panel when applied to a shirt.

Fig. 11 is a top view of a portion of a folded shirt with board made from the blank of Fig. 8, as applied thereto.

Fig. 12 is a plan view of a cardboard blank cut and scored in an alternative manner.

Fig. 13 is a perspective view illustrating an intermediate step in the folding of the blank of Fig. 12.

Fig. 14 is a perspective view of the blank in that folded condition it assumes when applied to a shirt.

Referring more in detail to the drawings—

Figure 7:
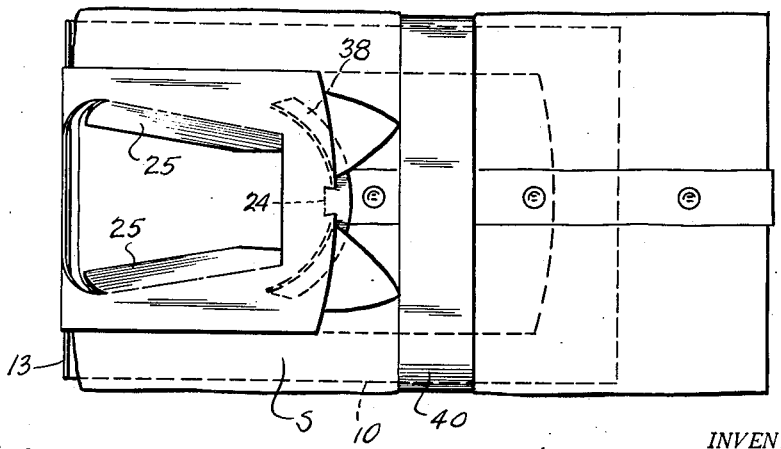
Fig. 7 is a top view of the shirt with board and collar protector applied thereto, and paper tie applied about the shirt.

The present shirt board and collar support and protector, as disclosed in the folded condition of use in Figs. 3 and 7, is made from a single cardboard blank of rectangular form; such blank being designated in its entirety in Fig. 1 by numeral 10. The blank for making a board of most practical size, is twelve inches long and eight inches wide. However, the dimensions may be varied to meet requirements of use. The scoring and cutting of the flat blank for its present use is as follows:

Across one end of the blank, approximately 1¾ inches from that end edge, is a line of scoring 12. This extends straight across the blank from edge to edge and provides for easy up bending of the end panel 13 of the blank that is thus set off, to an upright position. Formed in the blank, parallel with its longitudinal, opposite side edges, and spaced approximately 1¼ inches therefrom, are slits or cuts 14 and 14, each of which extends from the line of scoring 12 to about 3 inches from the edge of the opposite end of the blank, where they are joined by a transversely directed and arcuately curved cut 15. Thus, the substantially rectangular panel defined by the parallel cuts 14 and 14, and transverse cut 15 may be swung downwardly from the blank and by bending along the line of scoring 12, may be extended in a direction opposite its original position as has been illustrated in Figs. 2 and 4. The partially detached panel forms the collar protecting and supporting portion of the present combination, and the novel manner of cutting and scoring it for its specific use will now be described.

Referring more particularly to Fig. 1, it will be observed that the partially detached panel is formed across one end, with a line of scoring 20. This is parallel with and about two inches from the line of scoring 12, and it provides for the easy bending of the panel along this line. Located in the opposite or free end portion of the panel, and extending thereinto from its opposite side edges, and parallel with the adjacent or corresponding portions of the cross-cut 15, are slits 21—21 which terminate close to the medial line of the blank, there merging into quite short slits 22—22 that are directed back toward the opposite end of the panel. The two slits 22—22 define a short, narrow tongue 23 between them which join that end section of the panel that is located between the cut 15 and cuts 21—21, with the body portion of the panel. Extending directly between the inner ends of the slits 22—22, is a transverse line of scoring 24, providing for the downfolding of the tongue along this line, thus to bring the transverse strip into the position relative to the panel in which it is shown in Fig. 3.

Formed in the central portion of the panel are two downwardly foldable wings 25—25. These are formed in the following described manner: A transverse slit 30 is cut through the medial portion of the panel in coincidence with the line of scoring 20. At its opposite ends, about one inch from the cuts 14—14, the cut 30 terminates in parts 30'—30' that are curved toward the free end of the panel. Also formed in the panel, across the medial portion thereof and relatively close to the transverse slits 21—21, is a transverse slit 32. Lines of scoring 33 and 33' are extended between the outer ends of the cut 32 and the ends of the corresponding curved cuts 30'—30'. Also, there is a portion cut entirely from the panel leaving a hole 35 therein as shown in Fig. 1. This triangular hole is located in the central longitudinal line of the panel and is in the shape of an isosceles triangle. The base of the triangle coincides with the cut 30 and the sides extend toward the free end of the panel, parallel with the lines of scoring 33—33' respectively. From the vertex of the hole 35, which is in the central longitudinal line of the panel a cut 37 extends directly into the cross-cut line 32 and thus separates the wings 25—25. The width of the wings is substantially equal to the width of the transverse strip 38 that is formed between the cut 15 and 21—21. This arcuate strip 38 is the collar supporting member.

Assuming that the blank 10 is cut and scored as in Fig. 1, one mode of its application and use would be as follows: First, the partially detached panel that is to provide the support and protection for the collar portion of the shirt, is pushed downwardly from the blank, thus causing the left hand end portion of the board as seen in Fig. 2 to bend upwardly along the opposite end portions of the scored line 12, thus swinging this end portion 13 to the upturned position in which it is shown in Figs. 2 and 3. This portion I refer to as the protector flange. The panel is then further folded along that portion of the line of scoring 12 that is between the cuts 14 and 14, to cause the panel to extend beyond the upright flange 13, in a direction opposite to the direction of the board as has been illustrated in Fig. 4. Then the board is assembled with the shirt. This might be accomplished by folding the shirt about the board as is generally done, or by inserting the board endwise into the folded shirt.

Figure 4:
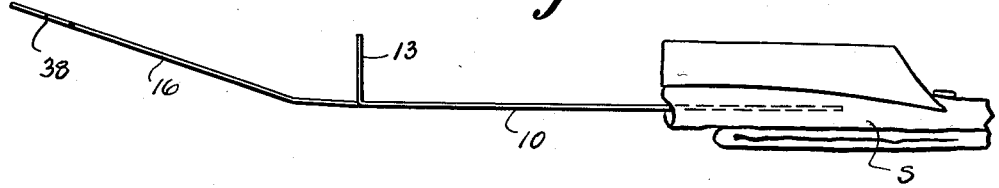
Fig. 4 is an edge view of the board, showing the initial step in its application to a folded shirt.
Figure 5:
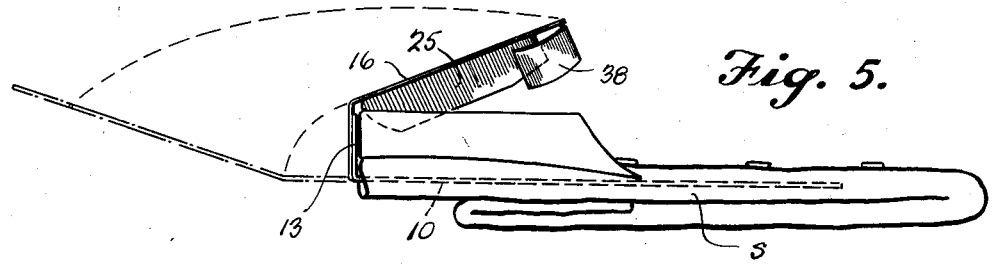
Fig. 5 is a similar view illustrating the folding of the collar protecting panel over the shirt collar after the rectangular board portion has been enclosed within the folded shirt.
Figure 6:
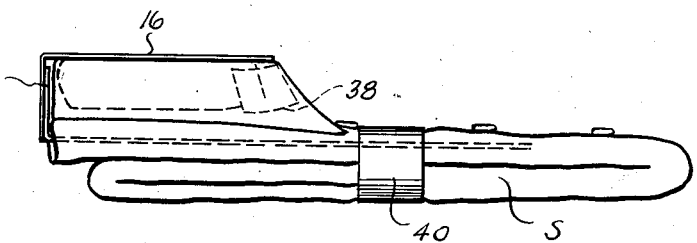
Fig. 6 is an edge view of the board and collar protector as finally applied to a shirt.

In Fig. 4, I have illustrated the board as being inserted into a shirt designated by reference character S, after it has been folded in the conventional manner. The association of the board with the shirt, regardless of the mode of application contemplates that the board will be so applied that that portion which is to the right of the upturned flange 13 in Fig. 4 will be enclosed within the folded shirt to retain it flat and extended in its folded condition, and the flange 13 will extend across the upper end edge of the folded shirt, closely adjacent the back of the collar as seen in Figs. 5, 6 and 7. With the flat board so applied to the shirt, the collar protecting panel is then swung from the dotted line position in which it is shown in Fig. 5, to the full line position, of Fig. 6, protectively overlying the collar portion of the shirt. In this latter operation, the wings 25—25 are folded downwardly from the panel along the lines of scoring 33—33 so that they will be received closely within opposite sides of the neck band portion of the collar. Also, the cross strip 38 that is set off at the end of the panel by the cross cuts 21—21, is turned downwardly by bending the tongue 23 downwardly along the scored line 24, as seen in Fig. 5, and its opposite ends are tucked beneath the wings of the shirt collar, as has been illustrated in Figs. 6 and 7.

It will be understood that with the board so applied to the shirt, the arcuate cross-strip 38 will be held substantially in upright position, and secured beneath the shirt collar. Thus, the flat collar protecting panel will be held over the shirt collar as shown in Figs. 6 and 7. Also, the wings 25—25 and the strip 38 give support to this panel due to the fact that they are substantially vertically disposed.

It is to be noted in Fig. 7, that the side edges of the panel extend well beyond the limits of the collar, and thus give it ample protection. Also, it is to be observed by reference to Fig. 6 that additional support for that portion of the panel that overlies the shirt collar is given by the protecting flange 13 that is upturned from the edge of the board and also by the adjacent upturned part to which the main portion of the panel is joined. The application of the usual paper tie 40 about the shirt, as seen in Fig. 7, holds the board in place and secures the package for handling and bundling.

The present invention is further illustrated in a modified or alternative form of device in Figs. 8, 9, 10 and 11. In Fig. 8, a cardboard panel 10x is shown to be formed, as is the panel 10 of Fig. 1, with a transverse line of scoring 12 setting off the panel 13 that constitutes the protector flange at that end. Also, this blank is formed in the same manner as is the board of Fig. 1, with longitudinal cuts 14 and 14 and an arcuate cut 15 setting off a partially detached collar protecting panel designated in its entirety by numeral 16. This panel is formed, at its free end, as in the device of Fig. 1, with arcuate cuts 21 and 21 setting off an arcuate cross strip 38. However, in lieu of forming this panel with two wings 25—25, the panel is formed, in its central body portion with a partially detached portion that is bounded across its base end by a line of scoring 60 of the same length and located in a position corresponding to the location of the cut 32 in the blank of Fig. 1, and at opposite sides and other end by one continuous cut 61 that extends along lines that are located in positions corresponding to the location of the lines of scoring 33—33 and cuts 30, 30'—30', in the blank of Fig. 1. Thus, a large sized tab 65 is partially detached from the panel 16. Formed across the tab 65, parallel with the line of scoring 60, is another scored line 66. This sets off a panel in the tab, designated at 77, for a purpose presently explained.

In using the device of Fig. 8, the mode of applying the board to a shirt is like that of the board previously described. The collar protecting panel also is folded over the shirt collar in the same manner as previously described, and secured by tucking the ends of the cross-strip 38 beneath the wings of the shirt collar as has been shown in Fig. 11. Then the tab 65 is folded downwardly along line 60 and bent one line 66 and is then pressed into the shirt collar. The panel 77 of this tab supplements the strip 38 to protect the shirt collar against being crushed.

Combinations of this kind are easily and readily applied, and give ample protection to the collar portions of the shirts, especially against being soiled, marked or wrinkled. As observed in Figs. 3 and 10, the horizontal collar protecting panel is supported at one end by the protector panel 13 that extends the full width of the board, and also by the vertical panel portion that attaches it to the board, at its outer end it is supported by the arcuate strip 38 that stands on edge. The wings 25—25 of the device of Fig. 3 give additional support as well as protection. This is also true of the panel 77 of the tab 65.

In Figs. 12, 13 and 14 I have illustrated still another modification of the present device; this form being patterned substantially after that shown in Figs. 1, 2 and 3. The card board blank is designated by character 10y and it is shown cut along lines 14—14 and 15 as are the blanks of Figs. 1 and 8, and also is formed with a similarly located line of transverse scoring 12 and arcuate cuts 21 to set off the arcuate tab 38. It also has the transverse scoring 12 for upward folding of the end flange 13.

The collar protecting panel, that is defined within the side lines 14—14 and transverse scoring 12 and end cuts 21—21, is formed across one end, at a position corresponding to the transverse line of scoring 20 in Fig. 1, with a similarly located line 20x, and with a cross slit 32x that corresponds in location to slit 32 in the card of Fig. 1. The panel is also divided longitudinally by a line 35x, formed with a zig-zag portion 35a. Also, there are lines of scoring 33x and a zig-zag crosscut 30x that corresponds in location to the scoring 33 and cross-cut 30 of the card of Fig. 1. Thus, there is set off, the two hinged wings 25y—25y corresponding to the wings 25—25 of the card of Fig. 1.

The wings 25y are transversely scored across their upper ends, as at 25d, and the adjacent end portions of the wings may be folded laterally therealong as in Fig. 14.

With the card so cut and scored it is applied and used in a manner like the cards of Figs. 1 and 8. However, in the down folding of the wings 25y after the panel has been folded over the collar portion of the shirt, the teeth formed in the wings by the zig-zag cutting at 35, will holdingly engage in the shirt and hold the wings in their protecting position. Also, the hinged tabs set off by the scored lines 25, will holdingly engage in the collar band to aid in holding the parts in the position of Fig. 14.

Having thus described my invention, what I claim as new therein and desire to secure by Letters Patent, is—

1. A shirt board of the character described comprising a flat, substantially rectangular blank of cardboard or the like, adapted for insertion within a folded shirt; said board being transversely scored across its outer end portion thus setting off a transverse flange forming portion, and there being a partially detached panel in the central body portion of the board, extending from said transverse line of scoring toward the inner end of the board; said panel being adapted, prior to the application of the board to a shirt, to be downwardly displaced from the body of the board, and then to be backwardly and upwardly hinged along said transverse line of scoring, thus to turn the said flange forming portion and the panel to upright positions; and said panel being transversely scored along a line that is slightly above the top edge of the upturned flange, along which line the upper end portion of the panel may then be downwardly hinged to protectively overlie the collar portion of the shirt to which the board may be applied.

2. A shirt board as recited in claim 1 wherein the said partially detached panel has a part at the free end thereof adapted to be holdingly engaged with the shirt collar to retain the panel in its collar protecting position.

3. A shirt board as recited in claim 1 wherein the free end of said partially detached panel has cuts therein extending from the opposite side edges inwardly to near the central line of the panel, thus to set off a transverse strip that is adapted to be turned downwardly from the said panel when in collar protecting position and its opposite end portions tucked beneath the opposite wings of the shirt collar and against the collar band to give protection to the band and support to that end of the panel.

4. A shirt board as recited in claim 1 wherein the free end of said partially detached panel has cuts therein extending from the opposite side edges inwardly to near the central line of the panel, thus to set off a transverse strip that is adapted to be turned downwardly from the said panel when in collar protecting position and its opposite end portions tucked beneath the opposite wings of the shirt collar and against the collar band to give protection to the band and support to that end of the panel, said partially detached panel having its lower end edge arcuately curved toward the inner end of the board, and said cuts being substantially parallel to the curved edge.

5. A shirt board as recited in claim 1 wherein the free end of the said partially detached panel has cuts therein extending inwardly from opposite edges of the panel to near the central longitudinal line of the panel, then turned angularly toward the hinged end of the panel to equal distances and joined across their inner ends by a line of scoring, thus setting off a transverse strip adapted to be turned downwardly from the panel along said line of scoring, and the ends of the strip to be tucked beneath opposite wings of the shirt collar and to protectively overlie the collar band at the front of the shirt, and to give support for that end of the panel.

6. A shirt board as recited in claim 1 wherein a flap is partially detached from the body portion of said panel and is adapted to be downwardly hinged therefrom after the board has been applied to a shirt and the panel has been brought to position over the shirt collar, thus to supportingly engage with the shirt within the collar band as an additional support for the panel.

7. A shirt board as recited in claim 1 wherein partially detached flaps are formed in the central body portion of the panel, at opposite sides of the longitudinal center line thereof, and said panel is scored for the downward hinging of said partially detached flaps to positions protectively overlying the opposite sides of the collar band of the shirt and to cause said flaps to engage at their lower edges with the shirt to give additional support to the panel when in its functional position.

8. A shirt board as recited in claim 1 wherein partially detached flaps are formed in the central body portion of the panel, at opposite sides of the longitudinal center line thereof, and said panel is scored for the downward hinging of said partially detached flaps to positions protectively overlying the opposite sides of the collar band of the shirt and to cause said flaps to engage at their lower edges with the shirt to give additional support to the panel when in its functional position, and to press at their ends against the upturned transverse flange portion to retain the relationship of the panel to the said flange.

9. A shirt board as recited in claim 1 wherein the free end of the said partially detached panel is cut from opposite side edges inwardly to near the central longitudinal line of the panel, and the inner ends of said cuts are joined by a line of scoring, thus setting off a transverse strip adapted to be turned downwardly along said joining line of scoring and its opposite ends tucked beneath the opposite wings of the shirt collar and against the collar band; said panel also having partially detached wing flaps formed in the body portion thereof at opposite sides of the central longitudinal line, hinged to the panel along their outer edges for downwardly folding into the collar portion of the shirt and against the opposite side portions of the collar band to protectively overlie the latter and to supplement the said cross strip in the support of the panel.

10. A shirt board as recited in claim 1 wherein the free end of said partially detached panel is cut from opposite side edges inwardly to near the central line of the panel, thus to set off a transverse strip adapted to be turned downwardly from the panel and its opposite end portions to be applied beneath the opposite wings of the shirt collar and against the collar band to give support to that end of the panel, and a partially detached tab is formed in the body portion of the collar protecting panel adapted to be downwardly displaced from the collar protecting panel along a transverse hinge line that is closely adjacent the said cross strip, said tab being transversely scored for bending thus to adapt its main portion to lie flatly against the shirt within the collar portion and the attached end of the tab to supplement the said cross strip in the support of the panel.

11. A shirt board as recited in claim 1 wherein partially detached wing flaps are formed in the central body portion of the panel at opposite sides of the longitudinal center line thereof and said panel is scored for the downward hinging of said partially detached flaps to portions protectively overlying the opposite sides of the collar band of the shirt, and to cause said wings to engage at their lower edges with the shirt to give additional support to the panel when in its functional position; said flaps being formed with serrated free edge surfaces designed to holdingly engage with the shirt material when pressed into holding position.

JOSEPH A. O'REILLY.

REFERENCES CITED

The following references are of record in the file of this patent:

UNITED STATES PATENTS

| Number | Name | Date |
|--------|------|------|
| 1,082,582 | Brown | Dec. 30, 1913 |